United States Patent [19]
Rajakovics

[11] 3,954,566
[45] May 4, 1976

[54] APPARATUS FOR COMPENSATING PRESSURE DROPS IN A TWO-STAGE EVAPORATION INSTALLATION

[75] Inventor: Gundolf E. Rajakovics, Vienna, Austria

[73] Assignee: Vereinigte Edelstahlwerke AG, Vienna, Austria

[22] Filed: Jan. 23, 1975

[21] Appl. No.: 543,418

[30] Foreign Application Priority Data
Jan. 25, 1974  Austria .................................. 637/74

[52] U.S. Cl. ............................. 202/185 A; 203/75; 203/82; 203/88; 203/90; 159/DIG. 17
[51] Int. Cl.² ........................ B01D 3/00; B01D 3/06
[58] Field of Search ................... 203/88, 42, 75, 82, 203/90, 160, 100 DC; 202/173, 185 A, 234; 159/20, 2, 3, DIG. 17, 48 L, 2 MS

[56] References Cited
UNITED STATES PATENTS

| | | | |
|---|---|---|---|
| 3,250,313 | 5/1966 | Irvin | 159/20 R |
| 3,607,663 | 9/1971 | Vandenberg | 159/2 MS |

FOREIGN PATENTS OR APPLICATIONS

| | | | |
|---|---|---|---|
| 1,215,046 | 4/1960 | France | 159/17 R |

*Primary Examiner*—Jack Sofer

[57] ABSTRACT

An improved arrangement is described for self-controlling the evaporation rate in the first stage of a two-stage expansion type evaporation installation for radio-active liquid purification, as described e.g. in the U.S. patent application Ser. No. 328065 filed on Jan. 30, 1973, in case of failure of the main circulating pump of the second stage. Such failure causes a pressure drop at the mixing condenser between first and second stage and normally, thus, a pressure drop in the first stage too. Such pressure drop leads to unwanted evaporation in the first stage and transfer to the second stage of excessive and insufficiently purified fluid from the first stage. A flow throttle element such as a diaphragm or a necked-down section of steam conduit is interposed between the vapor exit of the first stage and the mixing condenser in which the vapor is condensed by contact with a portion of the liquid from the second stage circulated therethrough by the pump. Any tendency of the amount of liquid evaporating in the first stage to unduly increase due to a pressure drop caused by pump failure of the second stage results in a corresponding increase of the pressure difference across the flow throttle element so that the pressure in the first stage does not decrease by the same amount as in the mixing condenser, thus preventing undue increase of the evaporation rate in the first stage.

2 Claims, 1 Drawing Figure

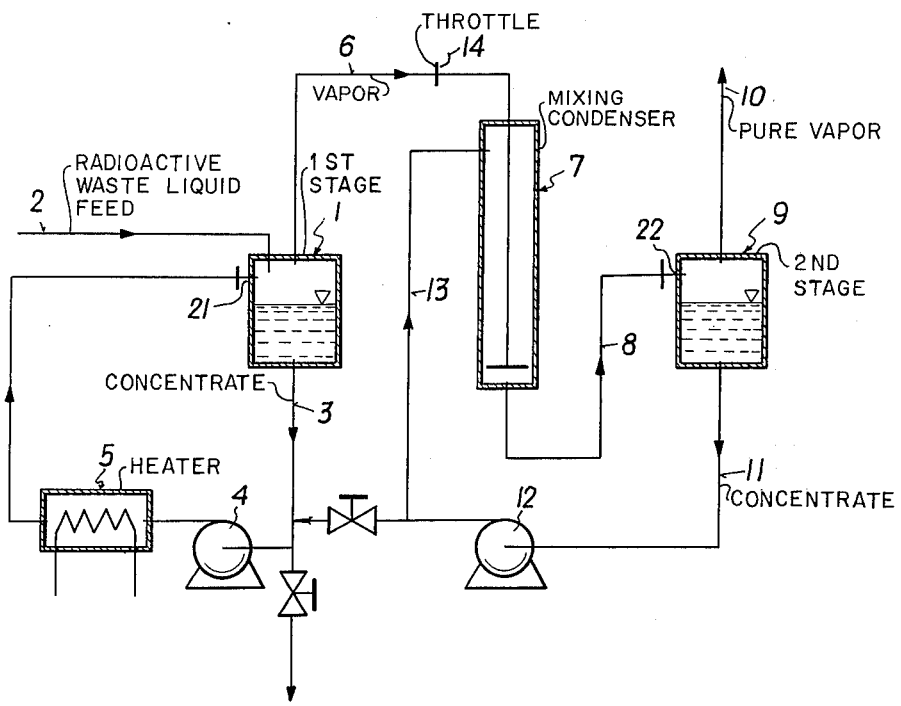

3,954,566

APPARATUS FOR COMPENSATING PRESSURE DROPS IN A TWO-STAGE EVAPORATION INSTALLATION

BACKGROUND OF THE INVENTION

Certain liquids, particularly radio-active waste water from nuclear installations, may be purified by means of a two-stage expansion-type evaporation installation. In such an arrangement radio-active liquid is circulated by a first circulating pump through a heat exchanger, in which evaporation heat is added, to the first stage in which a part of the liquid evaporates, the remaining liquid is recirculated by means of the first pump to the heat exchanger. A mixing condenser disposed intermediate the first and second stages receives the vapor exiting from the first stage, and such vapor is condensed therein by contact with a portion of the liquid present in the second stage, such portion being cycled into the mixing condenser by means of a second circulating pump. The so-condensed fluid in the mixing condenser is then introduced into the second stage itself.

The second pump maintains a counter-pressure in the mixing condenser which is normally equal to the pressure difference between the first and second stage; during normal operation, such first stage is normally maintained at a higher pressure than the second stage by the higher temperature of the vapor of the first stage.

Unfortunately, in case of failure of the second pump for any reason, the counter-pressure in the mixing condenser produced by this pump disappears and, thereby, the pressure in the first stage is suddenly lowered to that of the second stage (typically 1 atmosphere). Since the temperature existing in the first stage continues to correspond to the original pressure, the evaporation rate in the first stage suddenly increases at the time of such pressure drop, and the resulting high flow rate carries insufficiently purified fluid from the first stage to the second stage contaminating the second stage. The necessity of additional purification is costly and expensive leading to an undesired shutdown of the entire evaporation installation.

SUMMARY OF THE INVENTION

These disadvantages are eliminated by the present invention. In an illustrative embodiment, a flow throttle element such as a diaphragm or a reduced-diameter portion of vapor conduit is interposed between the vapor outlet of the first stage and the mixing condenser. In normal operation, i.e. when the circulating pump of the second stage maintains the counterpressure against the first stage, the normal flow through the throttle element results in a relatively small pressure drop in the vapor conduit. However, upon an increase in fluid flow rate through the throttle element caused by a sudden drop of the first stage pressure if the second pump is taken out of operation the pressure difference across the throttle element changes at a higher increase rate. The pressure difference between the first stage and the mixing condenser increases and the pressure in the first stage does not decrease as that in the mixing condenser. Thus, the evaporation rate in the first stage is limited to an admissible value in case of sudden pressure drop in the mixing condenser.

BRIEF DESCRIPTION OF THE DRAWING

The invention is further set forth in the following detailed description taken in conjunction with the appended drawing, in which the single FIGURE shows schematically a two-stage evaporation installation having facilities for self-control of evaporation in the first stage in accordance with the invention.

DETAILED DESCRIPTION

Referring now to the drawing, radio-active waste water or other liquid to be purified is conducted via conduit 2 to first stage 1 of a two-stage evaporation installation. First stage 1 which is conventionally adapted to produce an expansion-type evaporation of the liquid introduced therein has an outlet conduit 3 by which liquid of the first stage is recirculated via a first circulating pump 4 and a heat exchanger 5 to a second liquid input 21. The heat introduced into the liquid in the heat exchanger 5 is used for evaporating a part of the recirculating liquid when entering first stage 1. The so produced vapor is normally directed via vapor conduit 6 to mixing condenser 7.

Within mixing condenser 7 the vapor flowing in conduit 6 is condensed by contact with a portion of the liquid of second stage 9 of the installation, such liquid portion being introduced by means of a conduit path including tubes 11 and 13. A second circulating pump 12 is interposed between the tubes 11 and 13 to produce a required counter-pressure in the mixing condenser 7, such counter-pressure maintaining and corresponding to a normal pressure difference established between the stages 1 and 9. Illustratively, during equilibirum operation the stage 1 is normally maintained at 0.8 atm. above the pressure in the stage 9 which generally is 1 atmosphere. Vapor condensed in the mixing condenser 7 is introduced into second stage 9 via a conduit 8 and a liquid input 22. Purified vapor from the second stage is conducted to a suitable utilization facility (not shown) via conduit 10.

At normal operation of the apparatus so far described, a loss in pressure difference between the first and second stages due to failure of pump 12 causes a sudden expansion-type increase in evaporation activity in the first stage 1 so that a large amount of fluid is propelled into the conduit 6 without being sufficiently purified. Unless checked, such increase in flow rate of insufficiently purified fluid will be introduced into the second stage 9 via the mixing condenser 7 and such stage 9 will become polluted. In accordance with the invention such undesirable result is prevented by interposing in conduit 6 a throttle element represented schematically at 14. Such element 14, in the presence of a normal fluid flow in the conduit 6 during equilibrium conditions of pressures between the stages 1 and 9, will have a relatively small pressure drop (e.g. 0.2 atmospheres) so that the equilibrium pressure of 1.8 atm. in stage 1 will be composed of the 0.2 atm. pressure drop in element 14 and a 1.6 atm. counter-pressure in mixing condenser 7 produced by the second circulating pump 12. Typically, the vapor flow rate in the conduit 6 under such conditions amounts to about 4,000 m³/h.

In case of failure of pump 12 ceasing to eliminate the excess counter-pressure in mixing condenser 7, the resulting initial pressure loss in stage 1 will cause an increase of flow rate in conduit 6. However, because of the well-known phenomenon typical of throttle elements wherein the pressure drop therethrough increases as the square of any increase in rate of fluid flow therethrough, a doubling of the amount of fluid in conduit 6 during the initial sudden expansion in stage 1 would increase the pressure drop in throttle element 14 from 0.2 atm. to 0.8 atm. so that the total pressure difference between stage 1 and stage 9 (which continues to be maintained at atmospheric pressure) would be immediately restored to the equilibrium value of 0.8 atm. In this case, of course, the doubled evaporation rate necessary for compensating the pressure difference could not exist. The actual evaporation rate, therefore, will lie between the normal value and the doubled one.

Consequently, the amount of insufficiently purified fluid actually reaching the second stage will be negligible and will not require costly and timeconsuming purification steps.

The throttle element may be embodied by a physical stop member such as a diaphragm and the like. Preferably, however, it may be embodied by a necked-down or other reduced-diameter portion of the vapor tube 6 itself.

In the foregoing, the invention has been described in connection with an illustrative arrangement thereof. Many variations and modifications will now occur to those skilled in the art. It is accordingly desired that the scope of the appended claims not be limited to the specific disclosure herein contained.

What is claimed is:

1. In a two-stage evaporation installation for the purification of liquids wherein each stage contains a flash vessel, a recycle conduit, a recirculation pump therewithin, and a heat input to the first stage, the first stage being normally maintained at a pressure above that of the second stage and the vapor flashed in the first stage is condensed in a mixing condenser by contact with a portion of the liquid of the second stage that is forced into the mixing condenser by its recirculating pump producing the necessary pressure difference between the first and the second stage, the improvement which comprises throttling means disposed in a flash vapor connecting conduit between the first stage flash vessel and the mixing condenser, by which, in the event of an inadvertent excessive sudden pressure drop in the mixing condenser, occasioned by failure of the second stage recirculating pump, the resulting pressure decrease of the first stage accompanied by initially increasing evaporation rate in the first stage flash vessel will be thus controlled as to limit said initially increasing evaporation rate to an allowable admissible value.

2. An installation as defined in claim 1, in which the throttling means is a restricted or reduced diameter portion of the vapor conduit between the first stage and the mixing condenser.

* * * * *